(12) United States Patent
Barnes et al.

(10) Patent No.: US 8,667,939 B2
(45) Date of Patent: Mar. 11, 2014

(54) VARIABLE VALVE ACTUATION APPARATUS, SYSTEM AND METHOD

(75) Inventors: David M. Barnes, Columbus, IN (US); Adam C. Cecil, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 13/341,970

(22) Filed: Dec. 31, 2011

(65) Prior Publication Data
US 2012/0279465 A1    Nov. 8, 2012

Related U.S. Application Data

(63) Continuation of application No. PCT/US2010/024414, filed on Feb. 17, 2010.

(60) Provisional application No. 61/207,780, filed on Feb. 17, 2009.

(51) Int. Cl.
*F01L 1/34* (2006.01)

(52) U.S. Cl.
USPC ............... 123/90.17; 123/90.16; 123/90.6

(58) Field of Classification Search
USPC ......... 123/90.46, 90.47, 90.45, 90.44, 90.15, 123/90.41, 90.4, 90.39, 90.16, 90.17, 90.22, 123/320, 321, 90.1, 90.24–90.26, 90.2, 123/90.23, 90.6; 29/888.1; 464/160
See application file for complete search history.

(56) References Cited

U.S. PATENT DOCUMENTS

| | | | |
|---|---|---|---|
| 5,671,706 | A | 9/1997 | Frost et al. |
| 6,182,362 | B1 | 2/2001 | Lancefield |
| 6,213,071 | B1 | 4/2001 | Lancefield et al. |
| 6,247,436 | B1 | 6/2001 | Lancefield et al. |
| 6,250,267 | B1 | 6/2001 | Methley |
| 6,253,719 | B1 | 7/2001 | Methley |
| 6,253,720 | B1 | 7/2001 | Lancefield et al. |

(Continued)

FOREIGN PATENT DOCUMENTS

| | | | |
|---|---|---|---|
| GB | 2438628 A | * | 12/2007 |
| JP | 56107906 | | 8/1981 |

(Continued)

OTHER PUBLICATIONS

International Search Report and Written Opinion, ISAKR, PCT2010/024414, Cummins Inc., Aug. 18, 2010.

(Continued)

*Primary Examiner* — Thomas Denion
*Assistant Examiner* — Daniel Bernstein
(74) *Attorney, Agent, or Firm* — Krieg DeVault LLP

(57) ABSTRACT

In one form a rocker is disclosed coupled with a valve stem at one end and a cam follower at the other end. The rocker is operable to rotate about a fixed axis. In one form the cam follower includes a set of lower rollers operable to follow one cam lobe and an upper roller operable to follow another cam lobe. A leaf spring can be used to couple the cam follower with the rocker. A cam shaft can have a nested configuration including an inner shaft, an intermediate tube, and an outer tube. Cam lobes can be fastened to the cam shaft in one form by fastening through each of the inner shaft, intermediate tube, and outer tube, and in another form by attaching at least two devices inserted from either side of the cam shaft and that are not inserted at least through the inner shaft.

24 Claims, 13 Drawing Sheets

(56) References Cited

U.S. PATENT DOCUMENTS

| | | | |
|---|---|---|---|
| 6,263,845 B1 | 7/2001 | Lancefield et al. | |
| 6,308,669 B1 | 10/2001 | Lancefield et al. | |
| 6,354,255 B1 | 3/2002 | Methley et al. | |
| 6,487,997 B2 * | 12/2002 | Palumbo | 123/90.24 |
| 6,591,800 B1 | 7/2003 | Methley | |
| 6,725,817 B2 | 4/2004 | Methley et al. | |
| 6,725,818 B2 | 4/2004 | Methley | |
| 6,854,434 B2 | 2/2005 | Methley | |
| 6,941,910 B2 | 9/2005 | Methley | |
| 7,051,688 B2 | 5/2006 | Lancefield | |
| 7,117,831 B2 | 10/2006 | Methley | |
| 7,134,411 B2 | 11/2006 | Lancefield et al. | |
| 7,210,440 B2 | 5/2007 | Lawrence et al. | |
| 7,270,096 B2 | 9/2007 | Lancefield et al. | |
| 7,273,024 B2 | 9/2007 | Lancefield et al. | |
| 7,284,517 B2 | 10/2007 | Lancefield et al. | |
| 7,287,499 B2 | 10/2007 | Lawrence et al. | |
| 7,311,072 B2 | 12/2007 | Hoffmann et al. | |
| 7,318,399 B2 | 1/2008 | Methley | |
| 7,444,968 B2 | 11/2008 | Lancefield et al. | |
| 7,677,213 B2 * | 3/2010 | Deierlein | 123/90.16 |
| 8,033,261 B1 * | 10/2011 | Robbins | 123/90.44 |
| 8,113,158 B2 * | 2/2012 | Lancefield et al. | 123/90.17 |
| 2008/0184950 A1 | 8/2008 | Lawrence et al. | |
| 2008/0196681 A1 | 8/2008 | Lancefield et al. | |
| 2008/0223321 A1 | 9/2008 | Methley | |
| 2008/0257104 A1 | 10/2008 | Lancefield et al. | |

FOREIGN PATENT DOCUMENTS

| | | |
|---|---|---|
| JP | 59176411 | 10/1984 |
| JP | 2002054410 | 2/2002 |
| KR | 1019950014401 | 11/1995 |
| KR | 1020010061177 | 7/2001 |

OTHER PUBLICATIONS

International Search Report and Written Opinion, ISAKR, PCT2010/024405, Cummins Inc., Aug. 18, 2010.

* cited by examiner

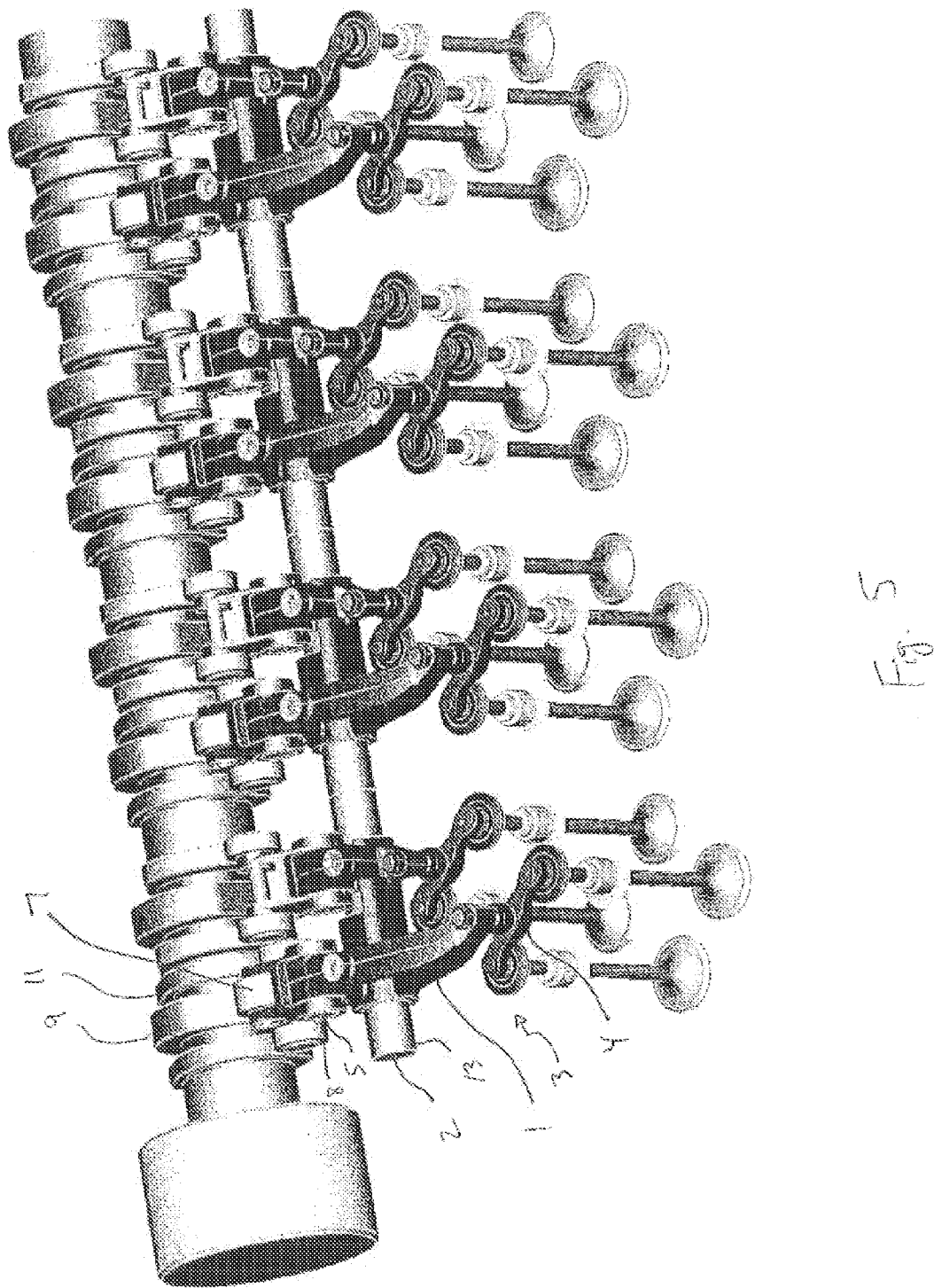

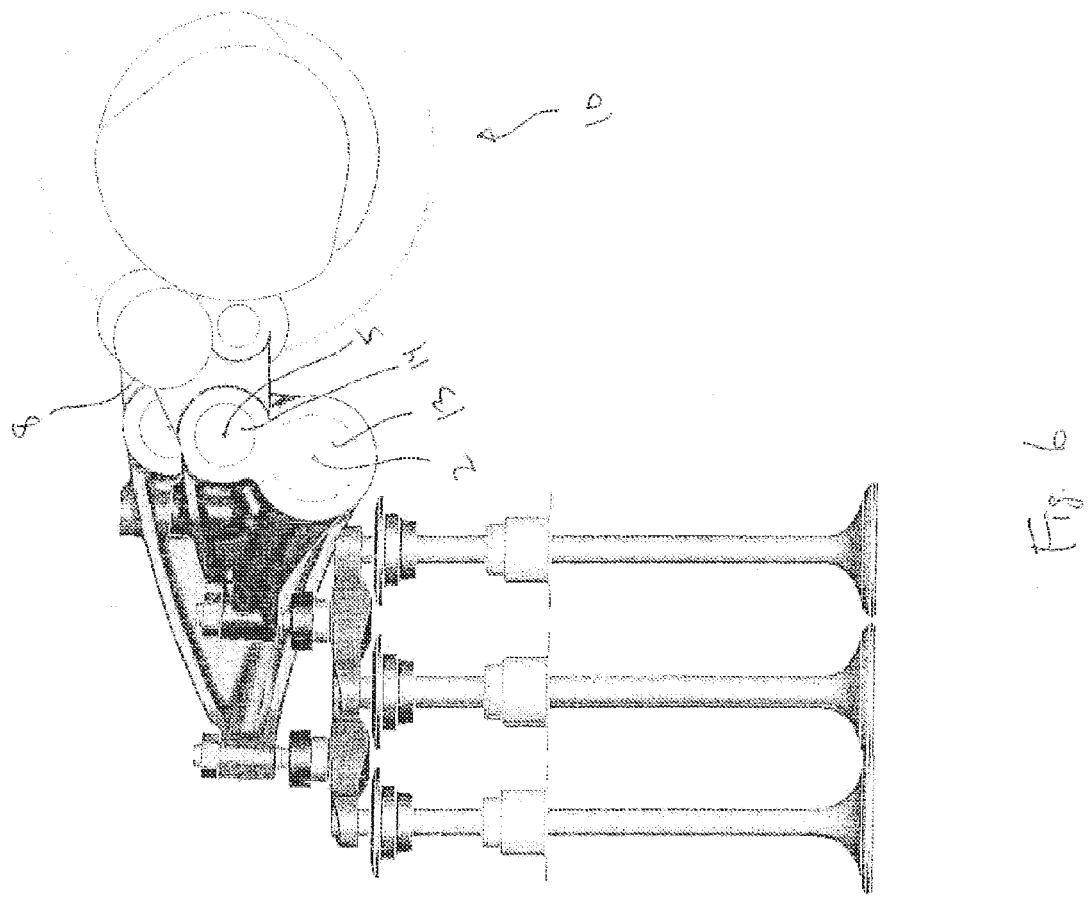

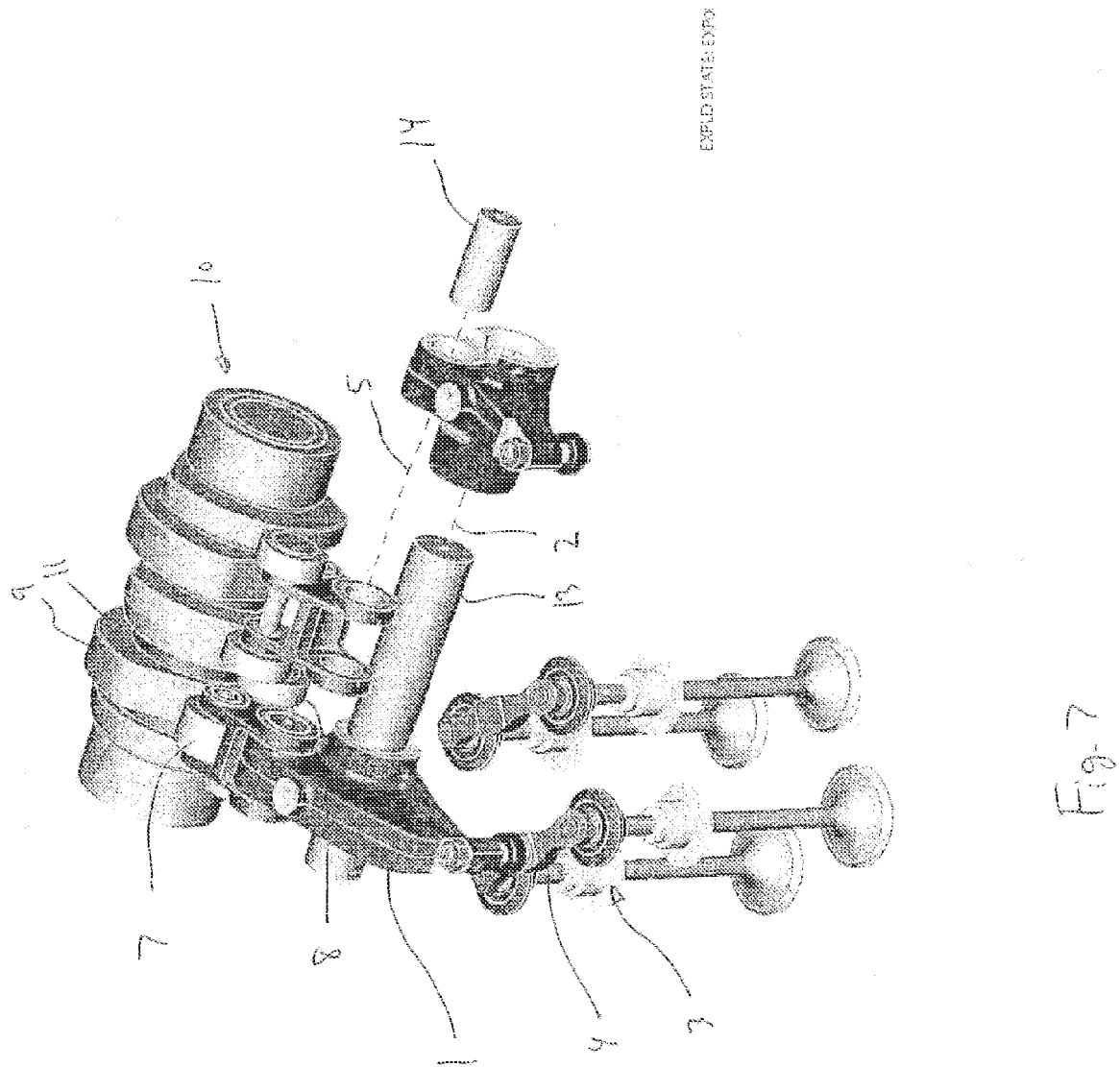

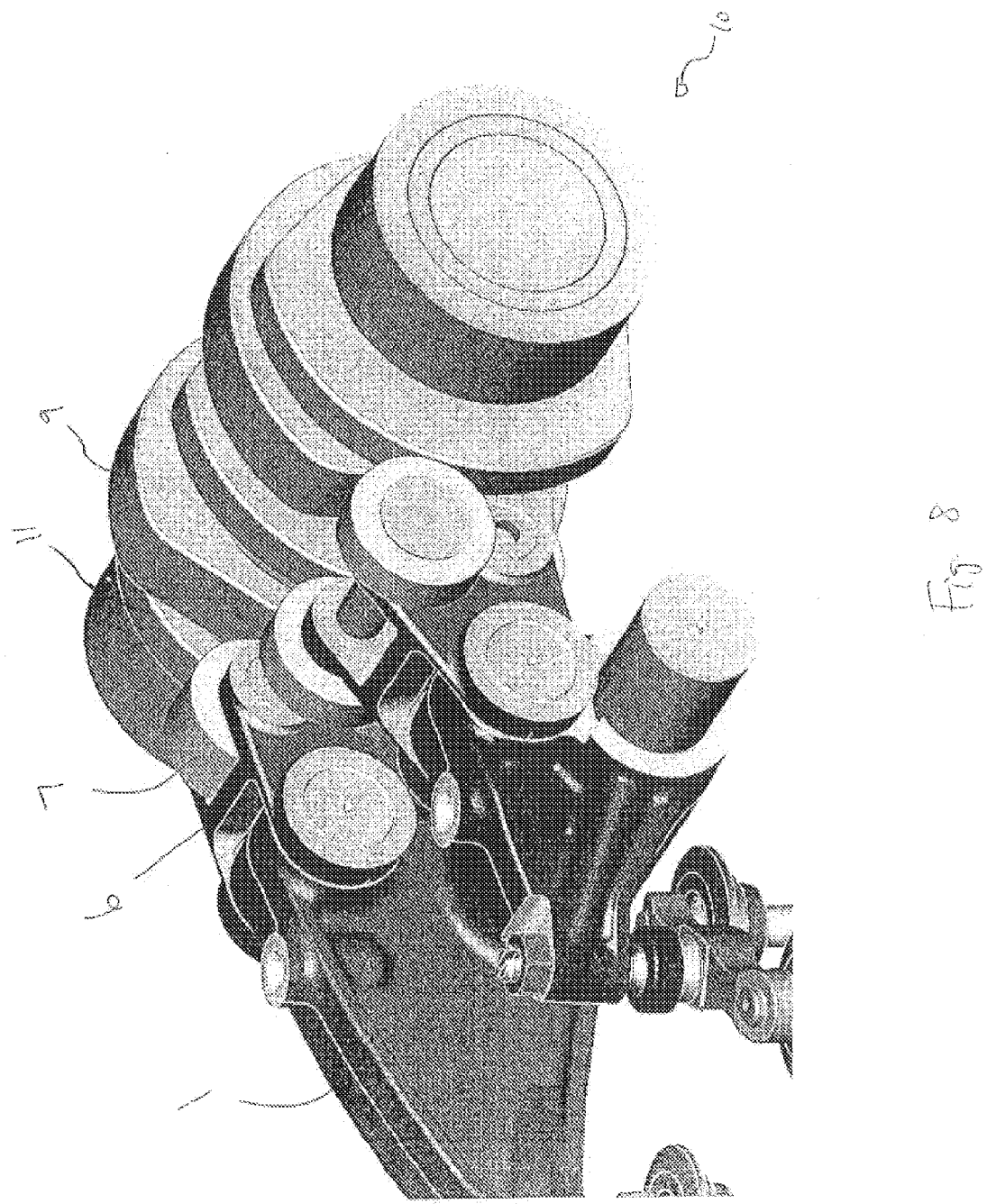

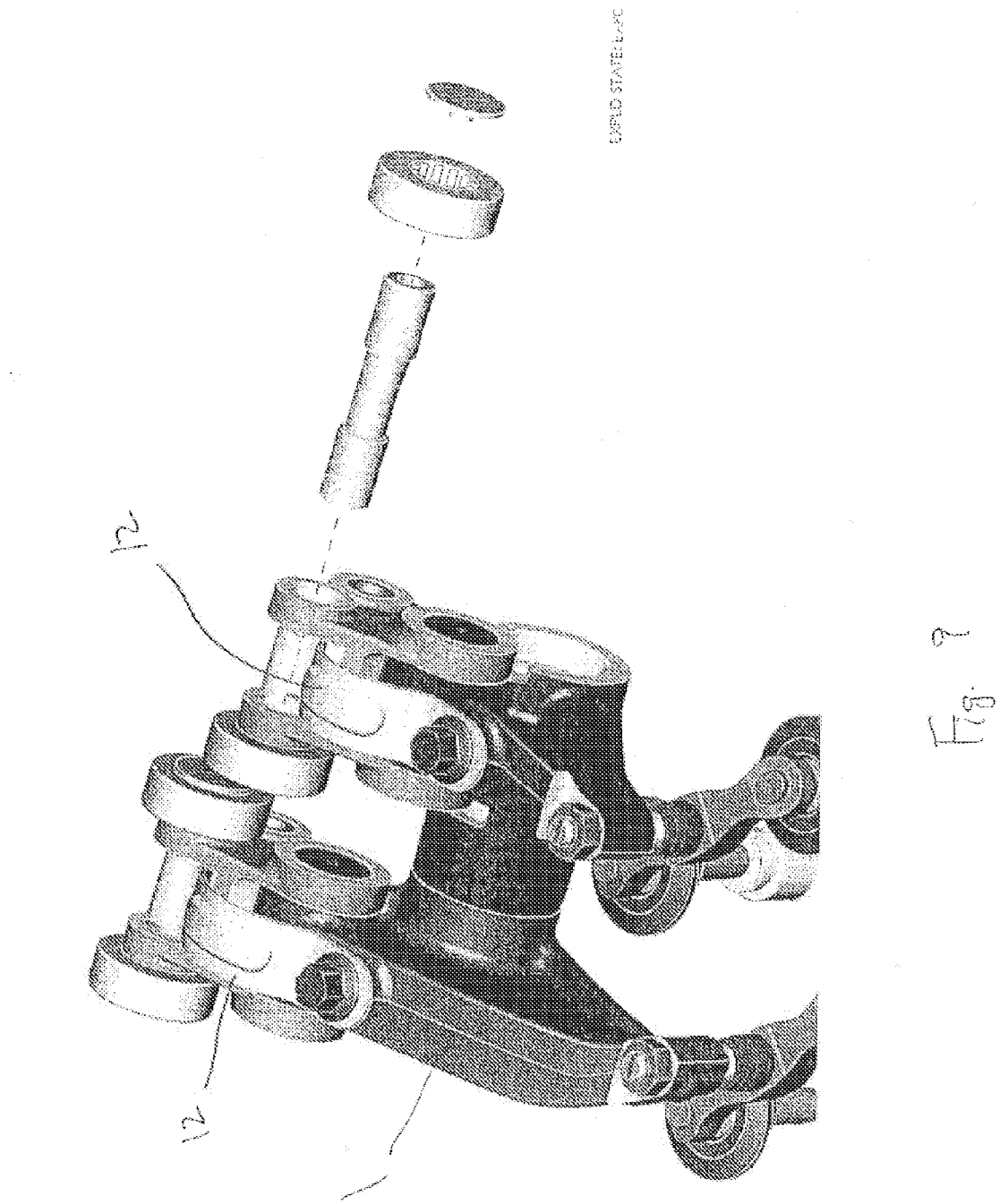

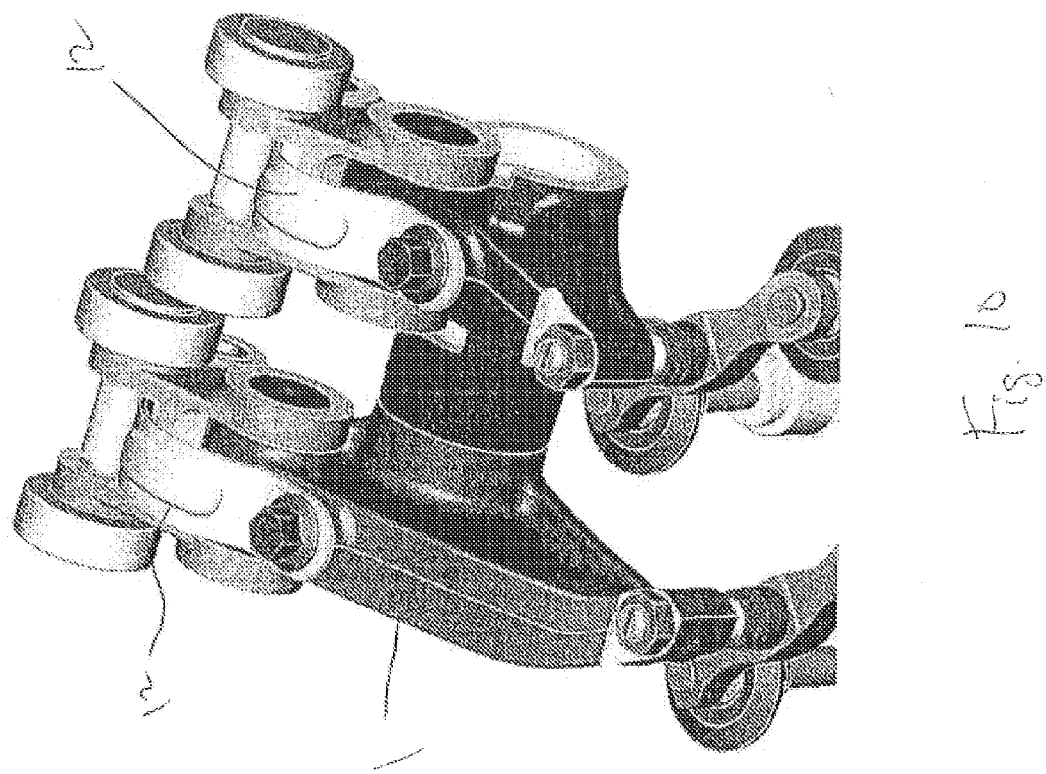

VARIABLE VALVE ACTUATION APPARATUS, SYSTEM AND METHOD

CROSS REFERENCE TO RELATED APPLICATIONS

The present application is a continuation of PCT Patent Application No. PCT/US2010/024414 filed on Feb. 17, 2010, which claims benefit to U.S. Provisional Patent Application No. 61/207,780, filed Feb. 17, 2009, each of which is incorporated herein by reference.

TECHNICAL FIELD

The present invention generally relates to internal combustion engines, and more particularly, but not exclusively, to variable valve actuation systems used in internal combustion engines such as diesel engines.

BACKGROUND

Variable valve actuation (VVA) can improve engine performance by enabling different combustion strategies at different operating conditions, including Miller cycling, internal exhaust gas recirculation (iEGR), thermal management for aftertreatment control, and decompression for engine starting. Both intake and exhaust valves can be variably actuated to enable this combustion strategies, changing the valve's lift and/or duration. Known VVA systems with both intake and exhaust lift and duration flexibility can be grouped into 3 categories: full electric, hydraulic lost motion (partially mechanical), and fully mechanical. One problem with full-functioning, fully mechanical VVA systems is their large physical size. Package space around the valves is classically limited due to height and width constraints and is increasingly limited in advanced engines due to increasing fuel system space claims. Accordingly, there remains a need for further contributions in this area of technology.

SUMMARY

One embodiment of the present invention is a unique variable valve actuation device. Other embodiments include apparatuses, systems, devices, hardware, methods, and combinations for providing variable valve actuation. Further embodiments, forms, features, aspects, benefits, and advantages of the present application shall become apparent from the description and figures provided herewith.

BRIEF DESCRIPTION OF THE FIGURES

FIG. 6 depicts one form of a cam shaft and rocker assembly.
FIG. 7 depicts one form of a cam shaft and rocker assembly.
FIG. 8 depicts one form of a cam shaft and rocker assembly.
FIG. 9 depicts one form of a rocker assembly.
FIG. 10 depicts one form of a rocker assembly.

DETAILED DESCRIPTION OF THE ILLUSTRATIVE EMBODIMENTS

Figure 1:
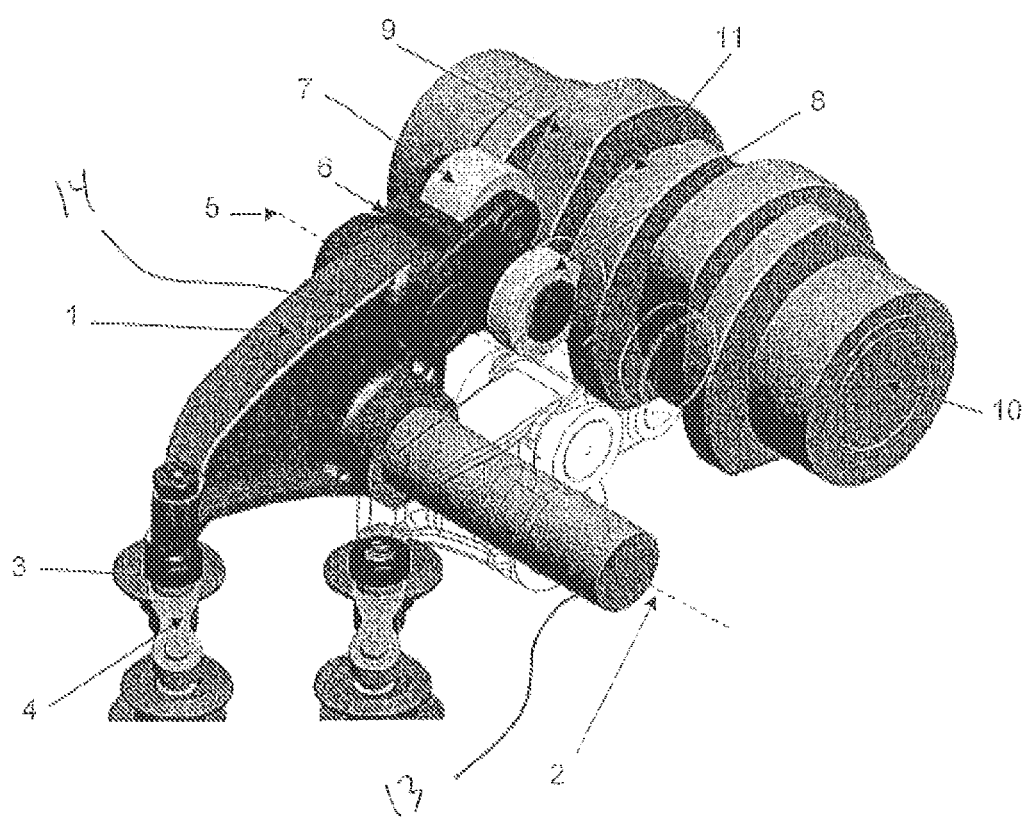
FIG. 1 depicts one form of a cam shaft and rocker assembly.
Figure 2:
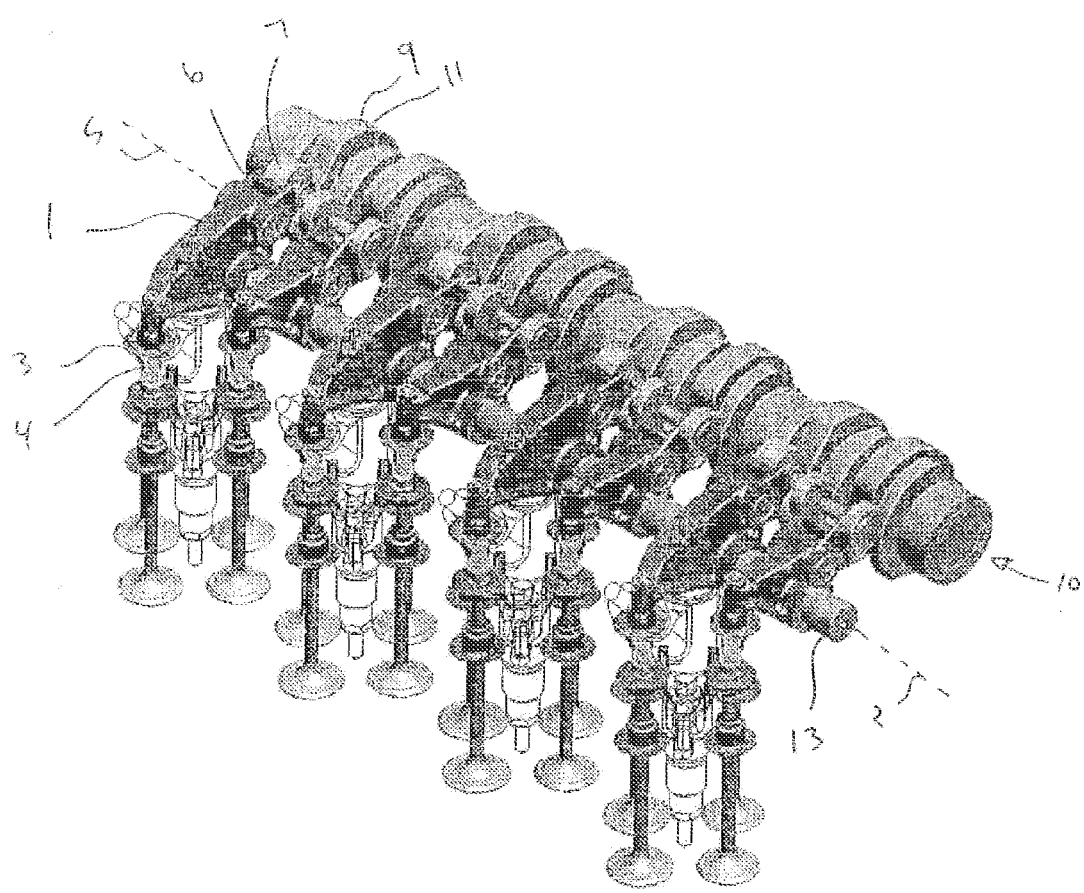
FIG. 2 depicts one form of a cam shaft and rocker assembly.
Figure 3:
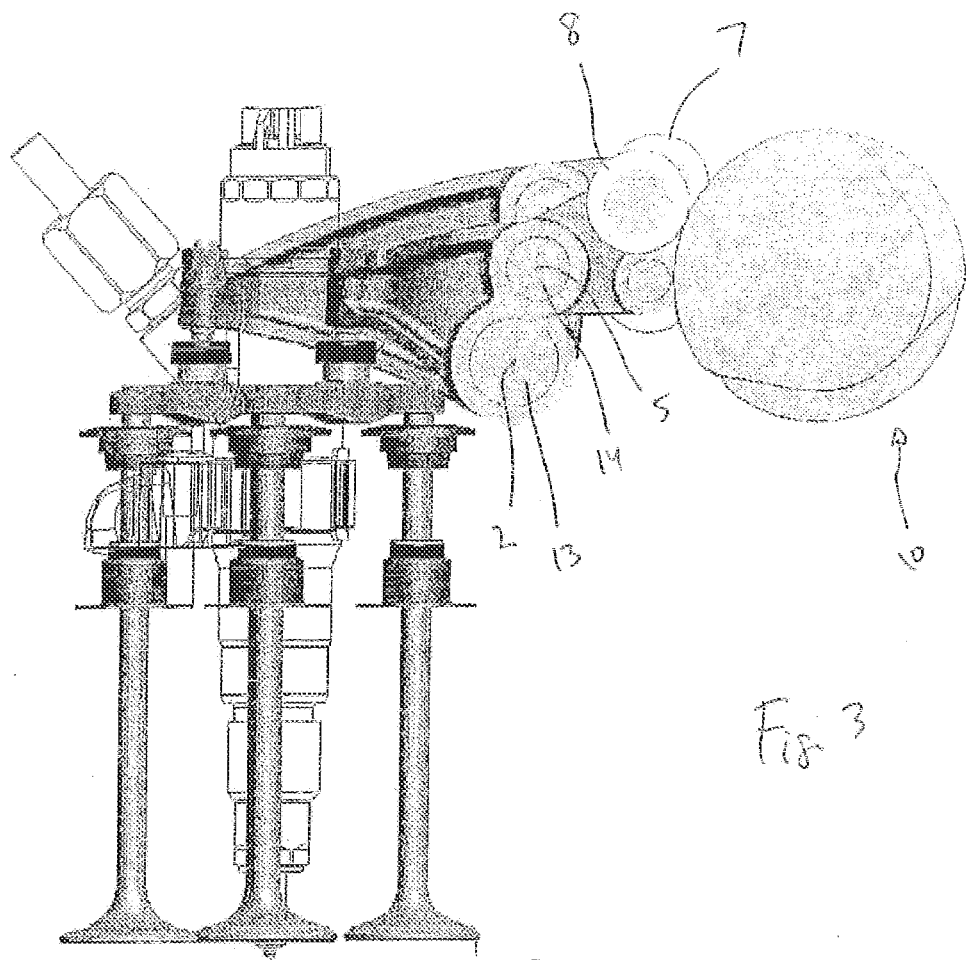
FIG. 3 depicts one form of a cam shaft and rocker assembly.
Figure 4:
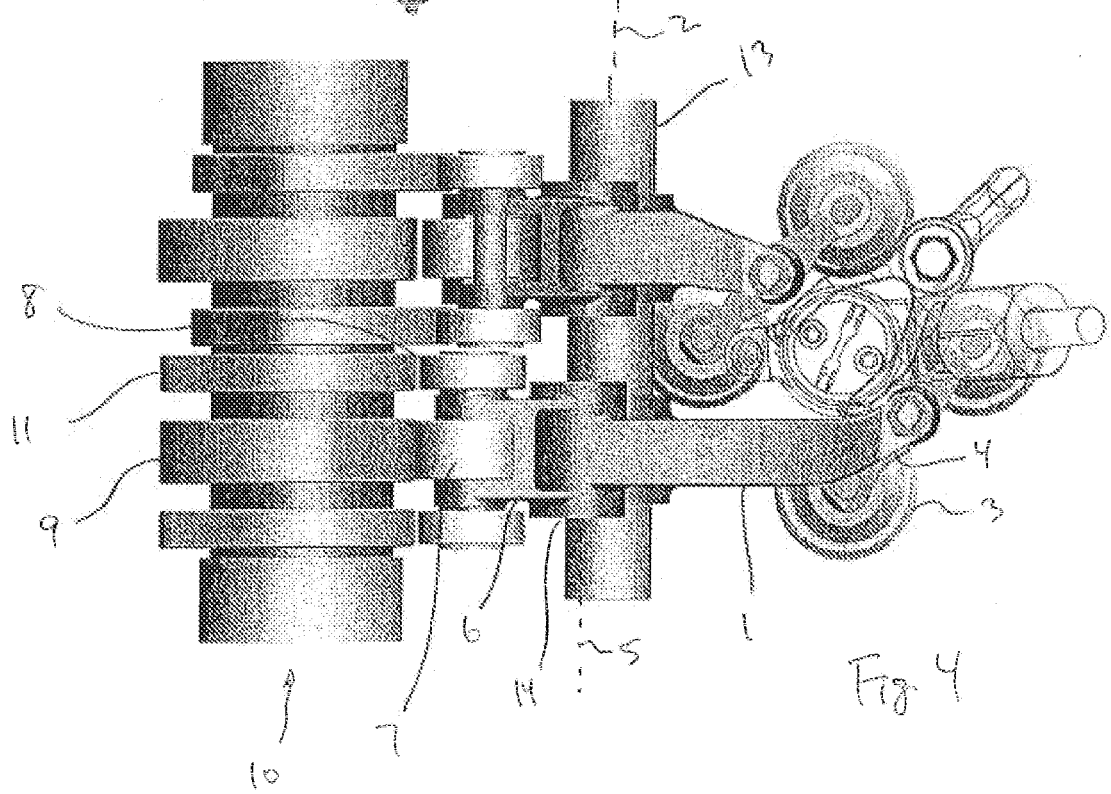
FIG. 4 depicts one form of a cam shaft and rocker assembly.
Figure 5A:
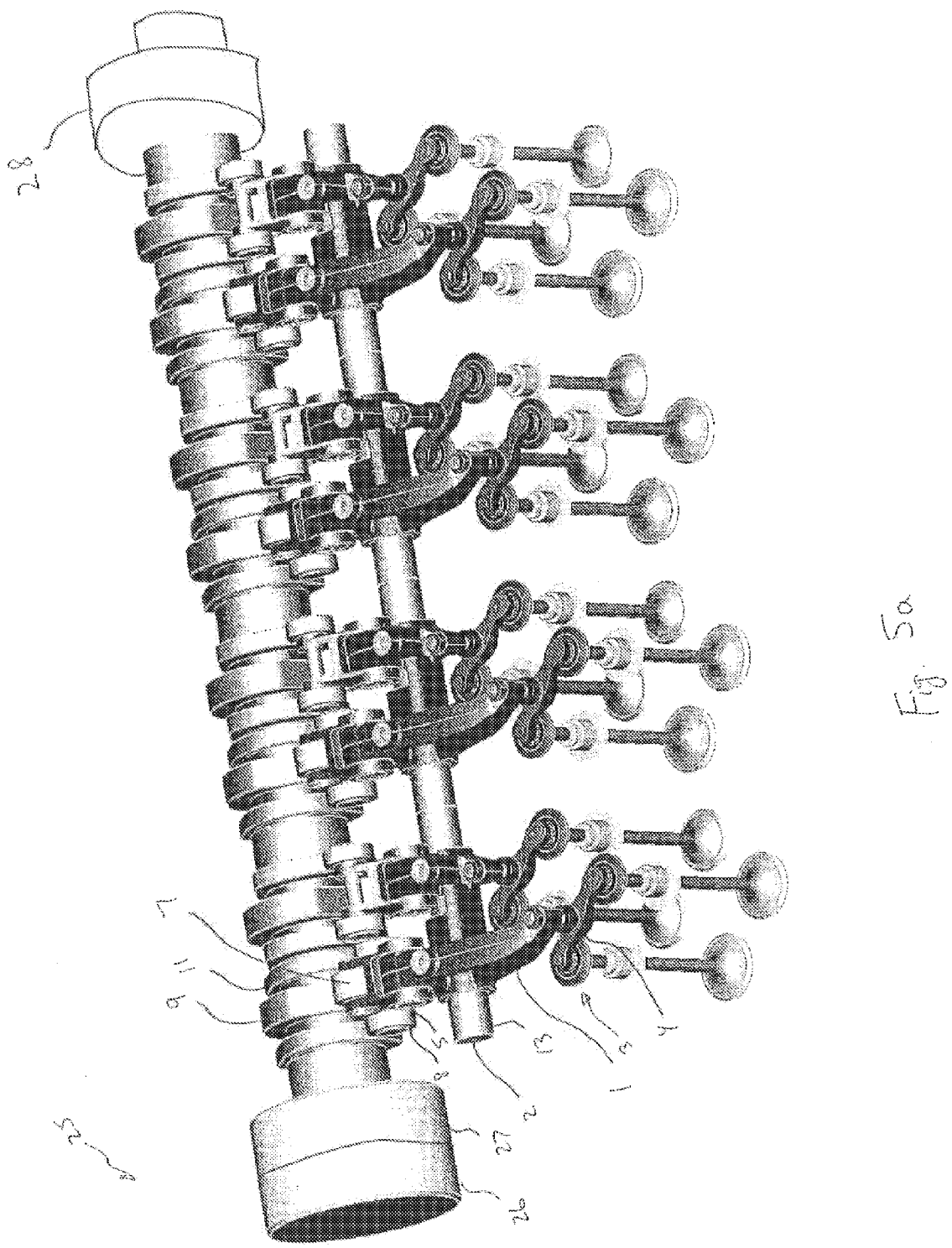
FIG. 5 depicts one form of a cam shaft and rocker assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one non-limiting embodiment the present application utilizes one double-concentric complex cam (sometimes referred to herein as a "double nested cam") to provide both intake and exhaust variable actuation and packages on only one side of the cylinder head. The double nested cam has one center shaft and two tubes including an intermediate tube and an outer tube. In one form non-variable lobes for both intake and exhaust function are attached to the outer tube. In one form one of the variable lobes is attached to the intermediate tube and the other of the variable lobes is attached to the center shaft. However, the present application further contemplates an embodiment wherein both of the intermediate tube and the outer tube have variable lobes.

With reference to FIGS. 1-9, a rocker 1 rotates around a fixed axis 2, moving an adjustable e-foot 3 which actuates traditional overhead poppet valves via a crosshead 4. A follower 6 is pivotally coupled to the rocker 1 about an axis 5. The rocker 1 is rotated about the fixed axis 2 through shaft 13 when it receives a force through its input axis 5, an axis along a pin 14, generated by the movement of the follower 6. The movement of the follower 6 is generated by the geometric constraints of its three axes: its output axis which is coaxial with the first rocker assembly's input axis 5; an axis through an upper roller 7; and an axis through a lower roller 8. The upper roller 7 follows a cam lobe 9 on the cam assembly 10 while the lower roller 8 follows a cam lobe 11 which is also on the cam assembly 10. In one form the lower cam/roller set can be paired with one set on either side of the cam lobe 9 so as to balance the follower 6. The lower cam lobe 11 causes the valve to open while the upper cam lobe 9 allows the valve to close. In an alternative embodiment the lower cam lobe 11 causes the valve to close while the upper cam lobe 9 causes the valve to open. Additional rocker motion is controlled via spring(s) (not illustrated). In one form, the spring(s) influence motion of the follower 6 such that the upper roller 7 disengages from the cam lobe 9 during at least a portion of a revolution of the cam assembly 10. In one form the fixed lobes 11 are attached to the outer tube of the camshaft assembly 10. In one form the cam lobe 9 can be either attached to the intermediate tube (intake) or the inner shaft (exhaust). One embodiment of the cam assembly 10 is discussed further hereinbelow. The inner shaft and inner tube modulation are controlled via a duplex cam phaser (not shown) or two phasers, one on each end of the cam. In other non-limiting embodiments, the modulation can be controlled via a duplex cam phaser 25 disposed toward one end of the cam assembly (having phasers 26 and 27) and another phaser 28 can be disposed toward another end of the cam assembly, as is illustrated in FIG. 5a. Such embodiments may include additional rotating shaft and/or tube, as will be described further in one-nonlimiting form below. In one form the phaser 28 can be disposed on the drive end of the cam assembly.

Figure 11:
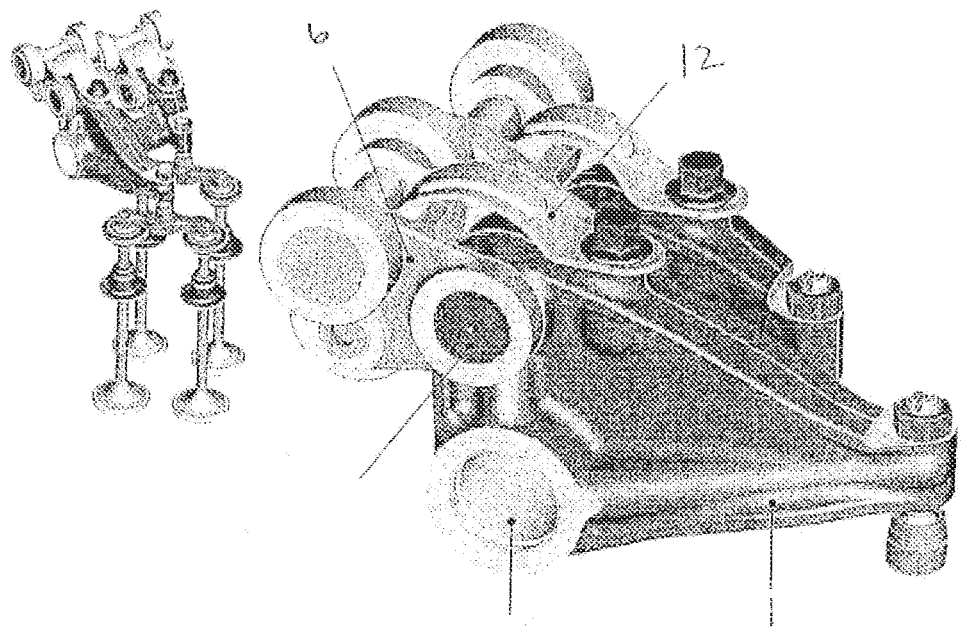
FIG. 11 depicts one form of a rocker assembly.

Turning now to FIGS. 9-11 and with continuing reference to FIGS. 1-8, the follower 6 is shown coupled with the rocker 1 using an energy storage device 12. in one form the energy storage device is a leaf spring. The energy storage device 12 biases the follower 6 into the cam lobe. In the illustrative embodiment the energy storage device 12 is attached at one end to the rocker 1 with a fastener but can be attached using other techniques. At the other end the energy storage device 12 engages the follower 6. The energy storage device 12 can engage the follower 6 in any variety of locations.

Figure 12:
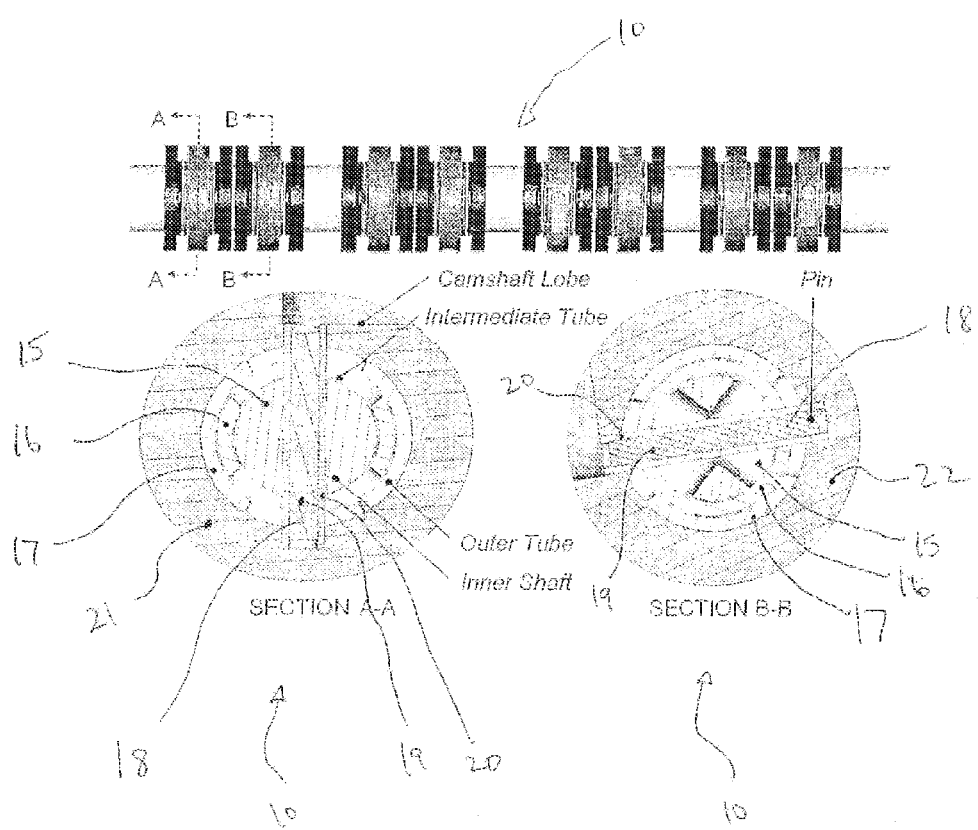
FIG. 12 depicts one form of a cam shaft.
Figure 13:
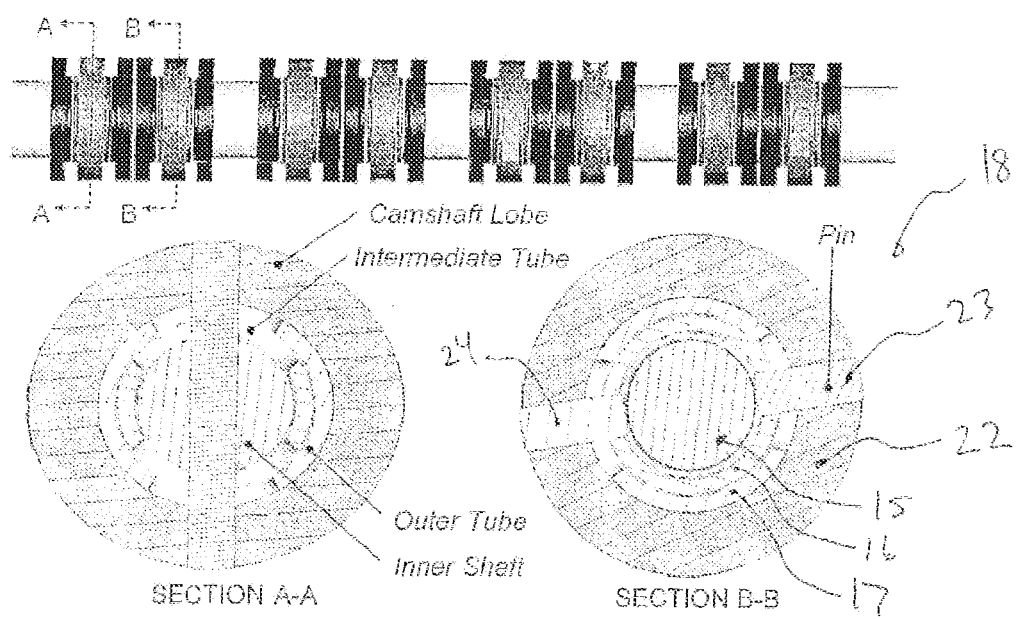
FIG. 13 depicts one form of a cam shaft.

Turning now to FIGS. 12-13, various views are depicted of a cam. The present application is not limited to the following techniques of assembly and can be assembled using other techniques of assembly in addition to those contemplated herein. In the illustrative form the cam assembly 10 includes an inner shaft 15, intermediate tube 16, and outer tube 17, each of which can be capable of being rotated independent of the others. In one embodiment a phaser arrangement such as that depicted in FIG. 5a can be used to manipulate each of the inner shaft 15, intermediate tube 16, and outer tube 17. A cam lobe 21, which can, but need not, represent the intake cam lobe, is coupled to the inner shaft 15 with a pin assembly 18 which can include a pin 19 and a sleeve 20. The pin assembly 18 can use a press fit or an interference fit, among possible other techniques. The cam lobe 21 can be coupled to the intermediate tube 16 and/or outer tube 17 in other embodiments. The intermediate tube 16 and the outer tube 17 include cutouts that allow the intermediate tube 16 and the outer tube 17 to rotate freely of the inner shaft 15. A cam lobe 22, which can represent the exhaust cam lobe, is coupled to the intermediate tube 16 with a pin assembly 18 which can include a pin 19 and sleeve 20. The cam lobe 22 can be coupled to the inner shaft 15 or the outer tube 17 in other embodiments. The pin assembly 18 used to connect the cam lobe 22 to the intermediate tube 16 is allowed to pass through apertures formed in the inner shaft 15 and outer tube 17. A cutout is formed in the inner shaft 15 to permit adequate range of motion for the cam assembly 10. Though the pin assembly 18 can be used to couple both the cam lobe 21 and cam lobe 22 to the inner shaft 15 and intermediate tube 16, respectively, other embodiments may use different assembly techniques to fasten the cam lobe 21 and cam lobe 22.

FIG. 13 depicts another embodiment of the cam assembly 10. The cam lobe 22 is depicted in this embodiment coupled with the intermediate tube 16 with a pin assembly 18 that includes pins 23 and 24. The outer tube 17 includes apertures that permit the pins 23 and 24 to pass. The pins 23 and 24, furthermore, can take the same form or can be different. The pins 23 and 24 in this embodiment are depicted without a sleeve as in the previous embodiment, but it will be appreciated that the particular fastening technique for either embodiment can be different than that depicted.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a cam follower operable to be pivotally coupled with a valve rocker arm and having a first rotatable member operable to be engaged with a first cam lobe substantially throughout a revolution of a cam shaft and a second rotatable member operable to be disengaged from a second cam lobe throughout a portion of the revolution; and
   wherein the camshaft includes a first elongate portion, a second elongate portion, and a third elongate portion, the first and second elongate portions operable to be independently clocked about the camshaft with the first cam lobe coupled with the first elongate portion and the second cam lobe coupled with the second elongate portion, wherein the first cam lobe is operable to be clocked to a rotational position relative to the second cam lobe by virtue of the relative orientation of the first and second elongate portions, the camshaft further including three phasers, each capable of moving one of the first elongate portion, the second elongate portion, and the third elongate portion.

2. The apparatus of claim 1, wherein the cam follower includes one end that is pivotally coupled with the valve rocker arm and a second end having the first rotatable member and the second rotatable member.

3. The apparatus of claim 2, which further includes an energy member operable to bias the cam follower such that the second rotatable member is disengaged from the second cam lobe.

4. The apparatus of claim 3, wherein the energy member is a spring.

5. The apparatus of claim 4, which further includes the valve rocker arm, wherein the spring is a leaf spring attached to the valve rocker arm and coupled with the cam follower.

6. The apparatus of claim 1, which further includes the valve rocker arm pivotally coupled with the cam follower, the rocker arm operable to be coupled with a shaft fixed relative to an engine block.

7. An apparatus comprising:
   a cam follower pivotally coupled with a rocker arm, the cam follower having an end that includes a first cam lobe contact member operable to contact a first cam lobe and a second cam lobe contact member operable to contact a second cam lobe; and
   a camshaft having a first elongate portion, a second elongate portion, and a third elongate portion, the first and second elongate portions operable to be independently clocked about the camshaft with the first cam lobe coupled with the first elongate portion and the second cam lobe coupled with the second elongate portion, wherein the first cam lobe is operable to be clocked to a rotational position relative to the second cam lobe by virtue of the relative orientation of the first and second elongate portions, the camshaft further including three phasers, each capable of moving one of the first elongate portion, the second elongate portion, and the third elongate portion.

8. The apparatus of claim 7, wherein the first cam lobe contact member is axially displaced from the second cam lobe contact member a distance along a pivot axis of the pivot aperture.

9. The apparatus of claim 7, wherein the first cam lobe contact member is a roller coupled to the cam follower.

10. The apparatus of claim 7, wherein the first cam lobe contact member includes two rollers axially displaced on either side of the second cam lobe contact member.

11. The apparatus of claim 7, wherein the cam follower includes a load bearing portion structured to receive a force from an energy member.

12. The apparatus of claim 11, wherein the energy member is a spring.

13. The apparatus of claim 12, wherein the spring is selected from the group consisting of a helical coil spring and a leaf spring.

14. A camshaft for use in an internal combustion engine, the cam shaft comprising:
- a camshaft having a first elongate portion, a second elongate portion, and a third elongate portion, the first and second elongate portions operable to be independently clocked about the camshaft;
- a first cam lobe coupled with the first elongate portion;
- a second cam lobe coupled with the second elongate portion;
- wherein the first cam lobe is operable to be clocked to a rotational position relative to the second cam lobe by virtue of the relative orientation of the first and second elongate portions; and
- further comprising three phasers, each capable of moving one of the first elongate portion, the second elongate portion, and the third elongate portion.

15. The apparatus of claim 14, wherein two phasers are each capable of clocking one of the first cam lobe and the second cam lobe.

16. The apparatus of claim 14, wherein the third elongate portion is rotatingly coupled with an engine crank shaft.

17. The apparatus of claim 14, wherein the first elongate portion is a shaft, the second elongate portion is an intermediate tube, and the third elongate portion is an outer tube.

18. The apparatus of claim 17, wherein the second cam lobe is coupled to the second elongate portion with a first member and a second member, the first member couples one side of the third elongate member to one side of the second elongate member, the second member couples the other side of the third elongate member to the other side of the second elongate member.

19. The apparatus of claim 14, wherein the first cam lobe is coupled to the first elongate portion with a member that traverses from one side of the first elongate portion to an opposite side of the first elongate portion.

20. The apparatus of claim 14, wherein the second cam lobe is coupled to the second elongate portion with a member that traverses from one side of the second elongate portion to an opposite side of the second elongate portion.

21. The apparatus of claim 14, wherein the first elongate portion is a shaft and the second elongate portion is a tube, the shaft located within the tube.

22. The apparatus of claim 14, wherein the first cam lobe is coupled to the first elongate portion with a coupling member traversing through the second elongate portion.

23. The apparatus of claim 14, wherein the first elongate portion is a shaft and the second elongate portion is a tube, the shaft located within the tube.

24. The apparatus of claim 23, wherein the first cam lobe is coupled to the first elongate portion with a coupling member traversing through the second elongate portion.

\* \* \* \* \*